(12) United States Patent
Cha

(10) Patent No.: US 6,212,439 B1
(45) Date of Patent: Apr. 3, 2001

(54) THREE MEMORY USER PROGRAMMABLE BUTTONS

(75) Inventor: Kyoung Hwan Cha, Seoul (KR)

(73) Assignee: Daewoo Telecom Ltd., Incheon (KR)

( * ) Notice: Subject to any disclaimer, the term of this patent is extended or adjusted under 35 U.S.C. 154(b) by 0 days.

(21) Appl. No.: 09/093,828

(22) Filed: May 12, 1998

(30) Foreign Application Priority Data

May 12, 1997 (KR) ................................. 97-18362

(51) Int. Cl.[7] .......................... G05B 11/01; G05B 15/00
(52) U.S. Cl. ................................. 700/83; 700/17; 700/84
(58) Field of Search ............................ 700/1, 5, 11, 15, 700/18, 87, 17, 83, 84

(56) References Cited

U.S. PATENT DOCUMENTS

| | | | |
|---|---|---|---|
| 3,618,022 | * 11/1971 | Isaacs et al. | 340/825.1 |
| 3,959,636 | * 5/1976 | Johnson et al. | 700/84 |
| 3,976,981 | * 8/1976 | Bowden | 700/10 |
| 4,228,506 | * 10/1980 | Ripley et al. | 705/3 |
| 4,697,231 | * 9/1987 | Boytor et al. | 700/83 |
| 5,225,974 | * 7/1993 | Mathews et al. | 438/1 |
| 5,321,829 | * 6/1994 | Zifferer | 714/46 |
| 5,537,574 | * 7/1996 | Elko et al. | 711/141 |
| 5,726,912 | * 3/1998 | Krall, Jr. et al. | 702/186 |
| 5,732,275 | * 3/1998 | Kullick et al. | 717/11 |
| 5,734,853 | * 3/1998 | Hendricks et al. | 345/352 |
| 6,002,400 | * 12/1999 | Loring et al. | 345/348 |
| 6,005,577 | * 12/1999 | Breitlow | 345/352 |
| 6,029,094 | * 2/2000 | Diffut | 700/32 |
| 6,032,255 | * 2/2000 | Shim et al. | 713/2 |
| 6,073,059 | * 6/2000 | Hayashi et al. | 700/204 |

* cited by examiner

*Primary Examiner*—Paul P. Gordon
*Assistant Examiner*—Iván Calcaño
(74) *Attorney, Agent, or Firm*—Lilling & Lilling P.C.

(57) ABSTRACT

A program selection driving device for a personal computer is provided, through which a user can executes a desirous program simply by operating a specified button, comprising a button panel 712 having a plurality of selecting buttons on an outside of a main computer 71 and a remote signal receiver 711 for inputting a specified remote control signal. A CPU 20 executes a corresponding program the user wants when a specified selecting signal is inputted from the button panel 712 and the remote signal receiver 711. And a hard disk of the computer includes a first memory region storing a program for the program selection driving and a second memory region storing directory information and execution file names related to selectable programs registered. A program can be registered in the second memory region, in execution of a program stored at the first memory region, by a drag and drop function. Accordingly, the user can register and change desirous programs with ease and set the kind of number of selectable programs as many as necessary variably.

6 Claims, 6 Drawing Sheets

| Scan Code | Directory Information | Execution File Name |
|---|---|---|
|  |  |  |
|  |  |  |
|  | . | |
|  | . | |
|  | . | |

THREE MEMORY USER PROGRAMMABLE BUTTONS

BACKGROUND OF THE INVENTION

1. Field of the Invention The present invention relates to a device for a personal computer, specifically relates to a program selection driving device of a personal computer, and a selecting signal input device therefor, capable of executing and terminating a predetermined program, installed in advance at user's option, simply using a corresponding program selecting button and a remote controller established on an outside of computer.

2. Discussion of Related Art

As personal computers have been distributed widely and rapidly and various works are processed through the personal computer, lots of computer programs have been applied increasingly.

In a common personal computer, executable programs are being stored at a hard disk. A user should search for a directory of a specified program first and then access the directory to execute the corresponding program.

Accordingly, in the conventional computer devices, a user has difficulties in executing a program he or she wants, in case the user lacks understanding of the computer. Besides, even in case of a skilled user, it is a trouble to repeat the operation process whenever the user executes programs.

In due consideration of the above matters, the Korean Patent Application No. 95-727 has proposed a program selection driving device for executing a specified program simply by operating a corresponding button.

FIG. 1 is a block diagram showing a configuration of the program selection driving device described above, in which reference numeral 1 denotes a button panel, established on an outside of computer, having a plurality of program selecting buttons.

In the figure, a button signal processor 2, for processing button signals inputted from the button panel 1, includes a button signal detector 2a detecting the button signals, data memory 2b storing the button signal from the button signal detector 2a, an interrupter 2c generating predetermined interrupt signals corresponding to the button signals and an input/output port 2d inputting and outputting data through the data memory 2b.

And a main board 3, executing corresponding programs based on a predetermined input signals inputted from the button signal processor 2, includes an input/output device 3a, connected with the input/output port 2d of the button signal processor 2, for inputting and outputting data through the data memory 3a, and a central processing unit (CPU) 3b for executing corresponding programs by reading out data from the input/output device 3a.

According to a program selection driving device in the above configuration, when a user presses down a specified button of the button panel 1, a predetermined level signal corresponding to the button operation is forwarded to the button signal detector 2a of the button signal processor 2, then a button signal corresponding to the level signal is outputted from the button signal detector 2a and stored at the data memory 2b. This way, when a button signal is stored at the data memory 2b, the interrupter 2c detects the button signal and then outputs a predetermined interrupt signal.

Meanwhile, the CPU 3b of the main board 3 reads out the button signal from the data memory 3b through the input/output device 3a and input/output port 2d of the button signal processor 2 and executes a corresponding program.

According to the configuration described above, the user can execute a desirous program, installed in advance, simply by operating a specified button.

However, there are some problems in the configuration described above of the program selection driving device as follows;

That is, as various programs are provided with the personal computer for user's end and the programs were set fixedly to corresponding program selecting buttons respectively in the personal computer applying the program selection driving device, a user who lacks understanding of a personal computer can utilize only a few specified programs he or she understands.

Especially, the program selection driving device cannot register a new program to a certain program selecting button or even change a selected program corresponding to a program selecting button at user's option, whereas new versions of computer program are presented generally as time goes by.

Accordingly, the conventional program selection driving device cannot substantially serve the user lacking in understanding of the personal computer, nevertheless it is originally developed for those users.

Furthermore, since the program selection driving device executes selected programs using interrupt signals and the number of available interrupt is limited in a common CPU and this interrupt function is used for the other purposes as well, the conventional program selection driving device for a personal computer limits the number of available program using program selecting buttons to only one or two, which causes some problems in applying it to a personal computer device.

SUMMARY OF THE INVENTION

Accordingly, the present invention is directed to a program selection driving device for a personal computer, which substantially obviates one or more of the problems described above.

It is an object of the present invention to provide a program selection driving device for a personal computer capable of allotting available programs to each corresponding pro gram selecting button at user's option through a simple procedure.

It is a further object of the present invention to provide a program selection driving device for a personal computer capable of allotting available programs to each corresponding program selecting button through r emote controller, not through a button operation.

Another object of the invention is to provide a program selection driving device for a personal computer capable of increasing the effective number of program executed selectively by button operation or remote controller.

To accomplish the objects of the invention, a program selection driving device for a personal computer, having a main computer with a hard disk and a main memory, a display means for displaying picture data visually and input means such as a keyboard, a mouse, and so on, comprising: a selecting means having a plurality of program selecting buttons for driving programs; a signal input means for receiving selecting signals from the selecting means and outputting predetermined data corresponding to the selecting signals; a first memory means, which stores an OS program, for storing available programs to be selected by the selecting means; a second memory means for storing a program for program selection driving; a third memory means for storing program information to be selected by the selecting means; and a central processing unit for executing the program stored at the second memory means, for detecting program information stored at the third memory means based on a selecting signal inputted from the signal input means, and for executing a corresponding program, stored at the first memory means according to the detected information, selectively; the selecting buttons are set to correspond with each predetermined program, and the program information stored at the third memory means can be reset to the respective selecting buttons at user's option, in execution of the program stored at the second memory means.

And the program allotment to the selecting buttons are to be executed by a drag and drop function.

In the above configuration according to the present invention, the user can select a desirous program and execute using a plurality of selecting buttons established on an outside of computer and a remote controller, and allot these selected programs to each desirous selecting button by a drag and drop function.

Furthermore, according to the present invention, it is possible to set the number of the program as many as necessary variably since the program selection driving is executed through the registered program information stored at the third memory means.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to an embodiment of the present invention which is illustrated in the accompanying drawings.

Figure 1:
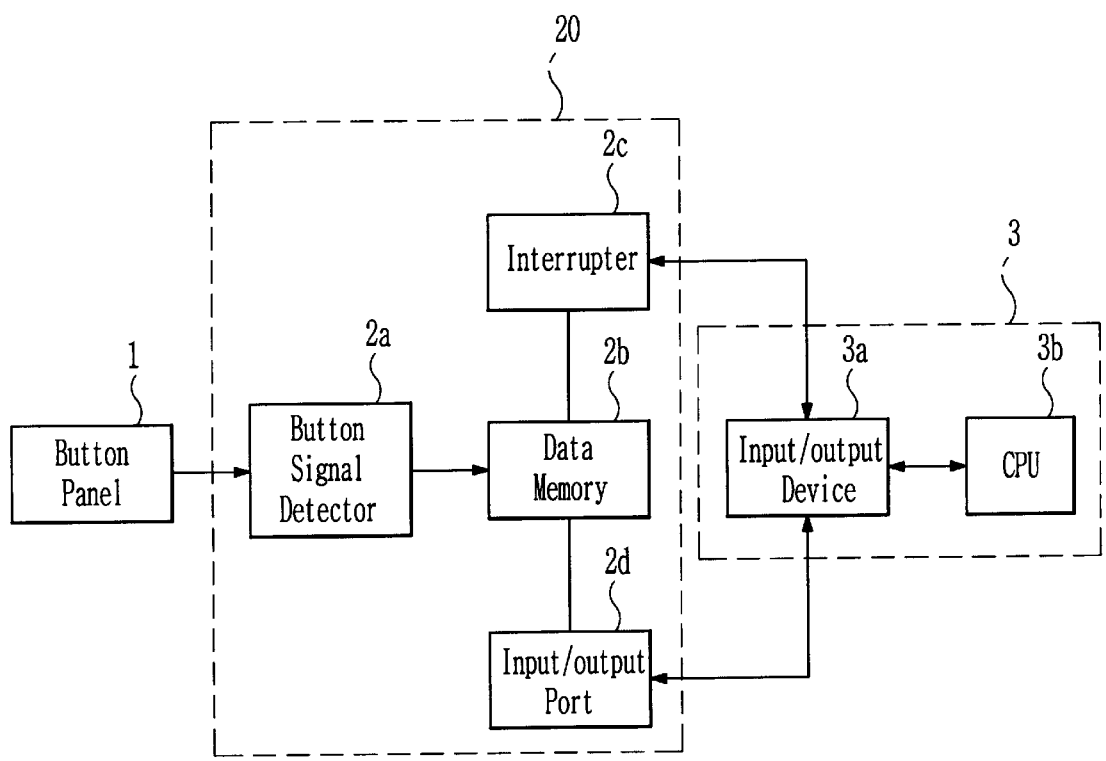
FIG. 1 is a block diagram showing a configuration of a conventional program selection driving device for a personal computer
Figure 2:
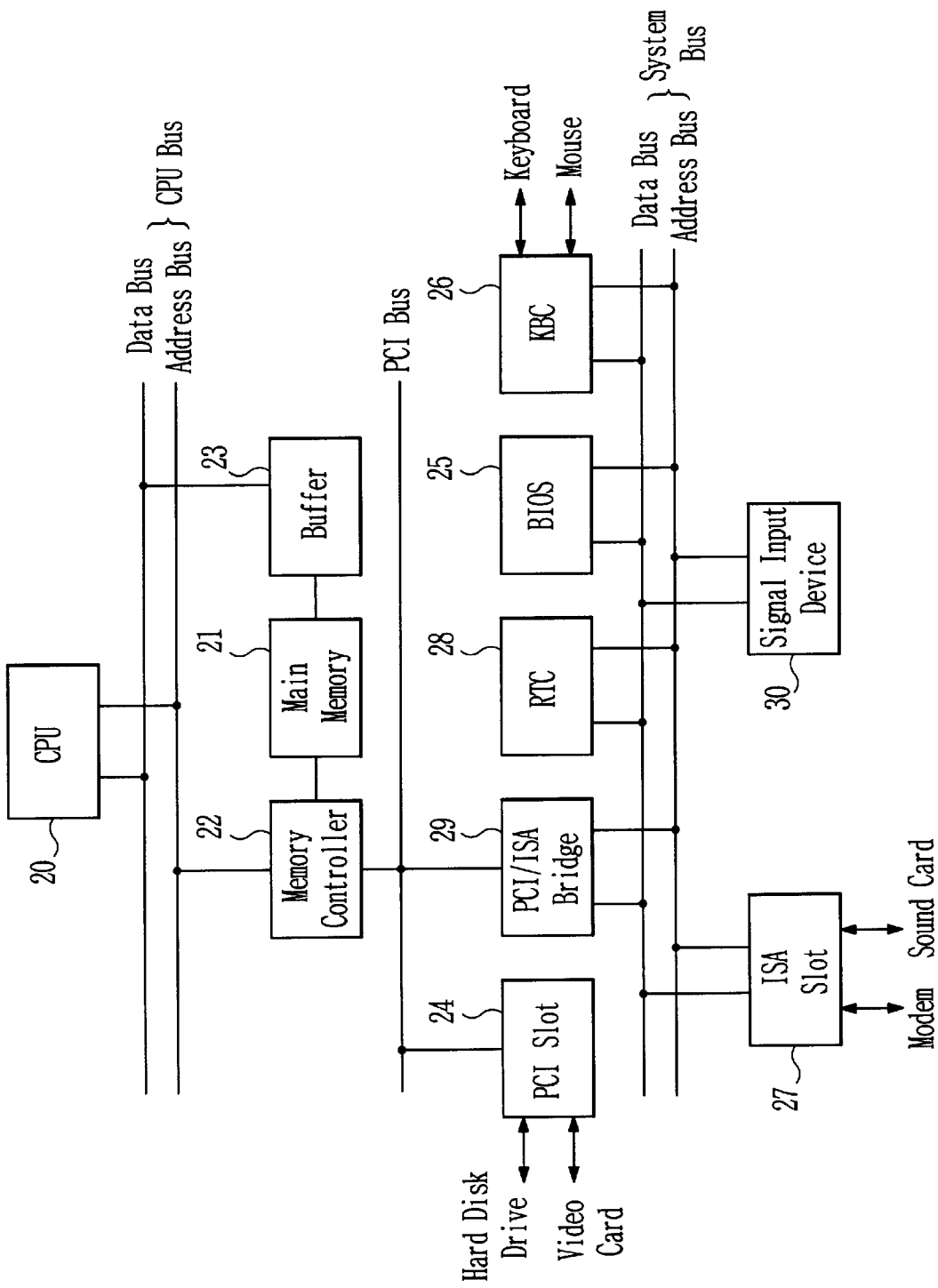
FIG. 2 shows a configuration of a system of a personal computer applying the program selection driving device according to the present invention.

First referring to FIG. 2, showing a general configuration of a personal computer according to the present invention, a CPU 20, a main memory 21 for storing various data and programs related to computer operation, and a memory controller 22 for controlling access operation against the main memory 21 based on address data forwarded from the CPU 20 are all connected with each other through a CPU bus, that is, a CPU data bus and CPU address bus.

And reference numeral 23 denotes a buffer for transmitting and receiving data between the CPU bus and a peripheral component interconnection bus (PCI bus).

PCI slot 24 is coupled with peripheral units operated at high speed, for example, a video card, for outputting video data through a monitor, and a hard disk drive. Here, the hard disk stores a specified control program for executing the program selection driving in accordance with the present invention.

Meanwhile, a BIOS 25 storing the control program of the CPU 20, a keyboard controller 26 controlling a keyboard or a mouse, an industry standard architecture (ISA) 27 linked with peripheral units operated at low speed such as a modem, a sound card, a floppy disk driver, a printer, and so on, and a real time clock 28 having a CMOS for setting up a CMOS are connected with each other through a system bus, that is, a system data bus and a system address bus.

Reference numeral 29 denotes a PCI/ISA bridge for controlling data transmit and receive between the PCI bus and the system bus and number 30 denotes a signal input device for inputting a predetermined data according to, for example, infrared signal from a remote controller, not depicted, and also for inputting a predetermined data according to an input from a plurality of selecting buttons for executing a specified program.

Figure 3:
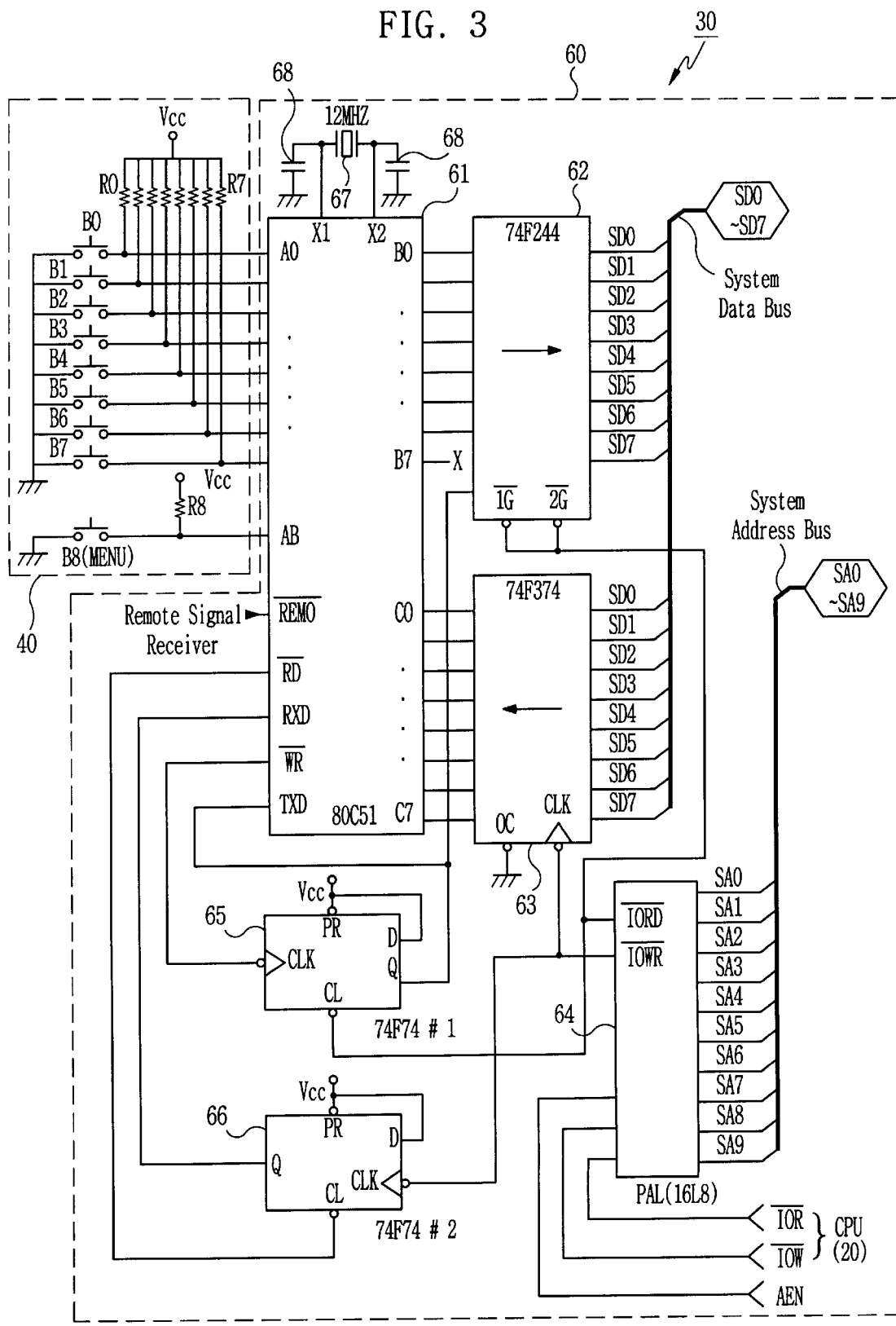
FIG. 3 shows a circuitry configuration of a signal input device of FIG. 2.

FIG. 3, showing a circuitry configuration of the signal input device, comprises a button panel 40 and a signal processor 60. The button panel 40 is constructed as a plurality of, for example, nine, pull-up resistors R0 to R8 and one-touch buttons B0 to B8 are connected in serial between a predetermined power source Vcc and a ground, and the nodes of the pull-up resistors R0 to R8 and the one-touch buttons B0 to B8 are linked with an input port A0 to A8 of a microprocessor 61 in the signal processor 60.

Meanwhile, the microprocessor 61 of the signal processor 60 receives predetermined level signals from the button panel 40 and remote signal receiver, not depicted, through the input port A0 to A8 ($\overline{REMO}$), and outputs predetermined scan code data corresponding to the level signals through an output port B0 to B6. And the scan code data is coupled with the system data bus through an output buffer 62.

An another input port C0 to C7 of the microprocessor 61 is connected with the system data bus through an input buffer 63 to receive predetermined command data from the CPU 20.

A programmable array logic (PAL) 64 decodes address data inputted through the system address bus, gates the input buffer 62 and the output buffer 63, and controls a first flip-flop 65 and a second flip-flop 66 which generate an output flag signal and an input flag signal respectively.

Here, the first flip-flop 65, in which an input port D is connected with a power source Vcc, a clock input port CLK is linked with a record signal output port $\overline{WR}$ of the microprocessor 61 and an output port Q is coupled with the output buffer 62 as an 8-bit signal input, forwards an output flag of "1" to the output buffer 62 as 8-bit data when a record signal $\overline{WR}$ of "L" level is outputted from the microprocessor 61.

And the second flip-flop 66, in which an input port D is connected with a power source Vcc, a clock input port CLK is linked with a record signal output port $\overline{IOWR}$ of the PAL 64 and an output port Q is coupled with a receive port RXD of the microprocessor 61, forwards an input flag of "1" to the microprocessor 61 when a record signal IOWR of "L" level is outputted from the PAL 64.

The first flip-flop 65 and the second flip-flop 66 are cleared by the $\overline{\text{IORD}}$ signal from the PAL 64 and the $\overline{\text{RD}}$ signal from the microprocessor 61.

Meanwhile, reference numeral 67 denotes a crystal oscillator generating a operating clock of the microprocessor 61, numeral 68 is a condenser eliminating noise of the operating clock generated by the crystal oscillator 68.

In the signal input device 30, when a predetermined remote control signal is inputted by operating a specified one-touch button B0 to B8 or the remote controller, the microprocessor 61 outputs a predetermined scan code data corresponding to the operating signal through the output port B0 to B6 and at the same time outputs an output flag of "1" through the system data bus by outputting a record signal $\overline{\text{WR}}$ of "L" level to the first flip-flop 65. And when an input flag of "1" is inputted from the second flip-flop 66 according to a record signal $\overline{\text{IOWR}}$ of "L" level inputted from the PAL 64, the microprocessor 61 inputs data through the input port C0 to C7 and outputs a detect signal $\overline{\text{RD}}$ of "L" level to clear the second flip-flop 66.

Figure 4:
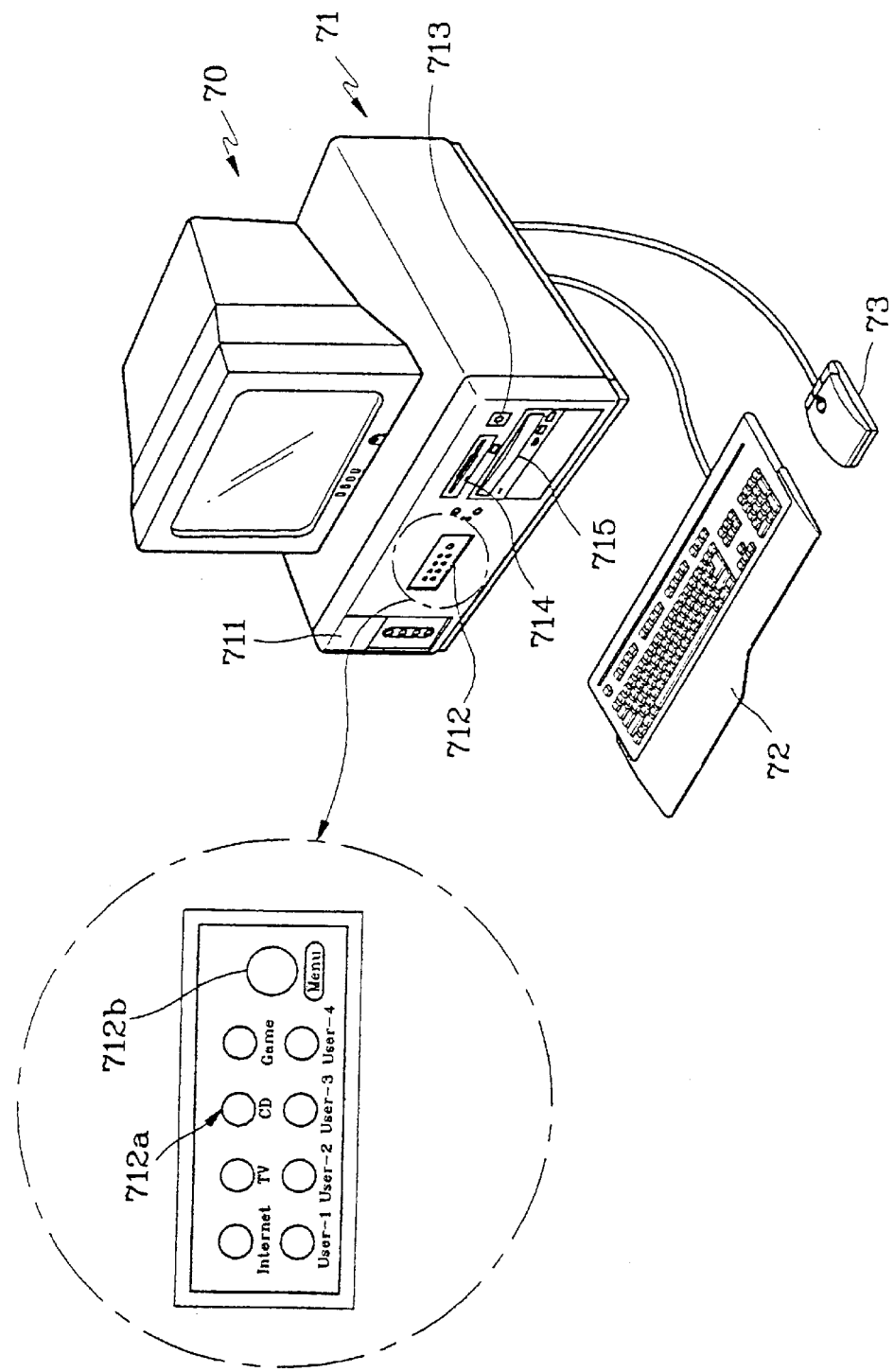
FIG. 4 is a external view showing a personal computer according to the print invention.

FIG. 4 is an external view showing a personal computer according to the present invention, comprising a monitor 70, a main computer 71, a keyboard 72 and a mouse 73; and a loudspeaker is included if necessary.

In front of the main computer 71, an infrared receiver 711 for receiving a remote control signal, for example, an infrared signal, a button panel 712 for executing the program selection driving, a power switch 713 for turning on and off the computer, a floppy disk driver 714 and a CD ROM driver 715 are established, as same as an usual computer.

The button panel 712 includes program selecting buttons 712a for executing the program selection driving and a menu button 712b for making reference to the programs registered corresponding to each program selecting button 712a.

Meanwhile, when a user turns on a computer using a power switch, the computer executes the cold boot operation, the cold boot operation is executed based on a program stored at the BIOS of FIG. 2. That is, the CPU 20 executes, first, a power on self test (POST) routine, a system check function for checking the circuitries, and executes an initializer routine by reading out CMOS of the RTC 28, and then executes an operation system (OS), for example, Window 95, by loading the data stored at a boot sector of a hard disk into the main memory 21.

Figure 5:
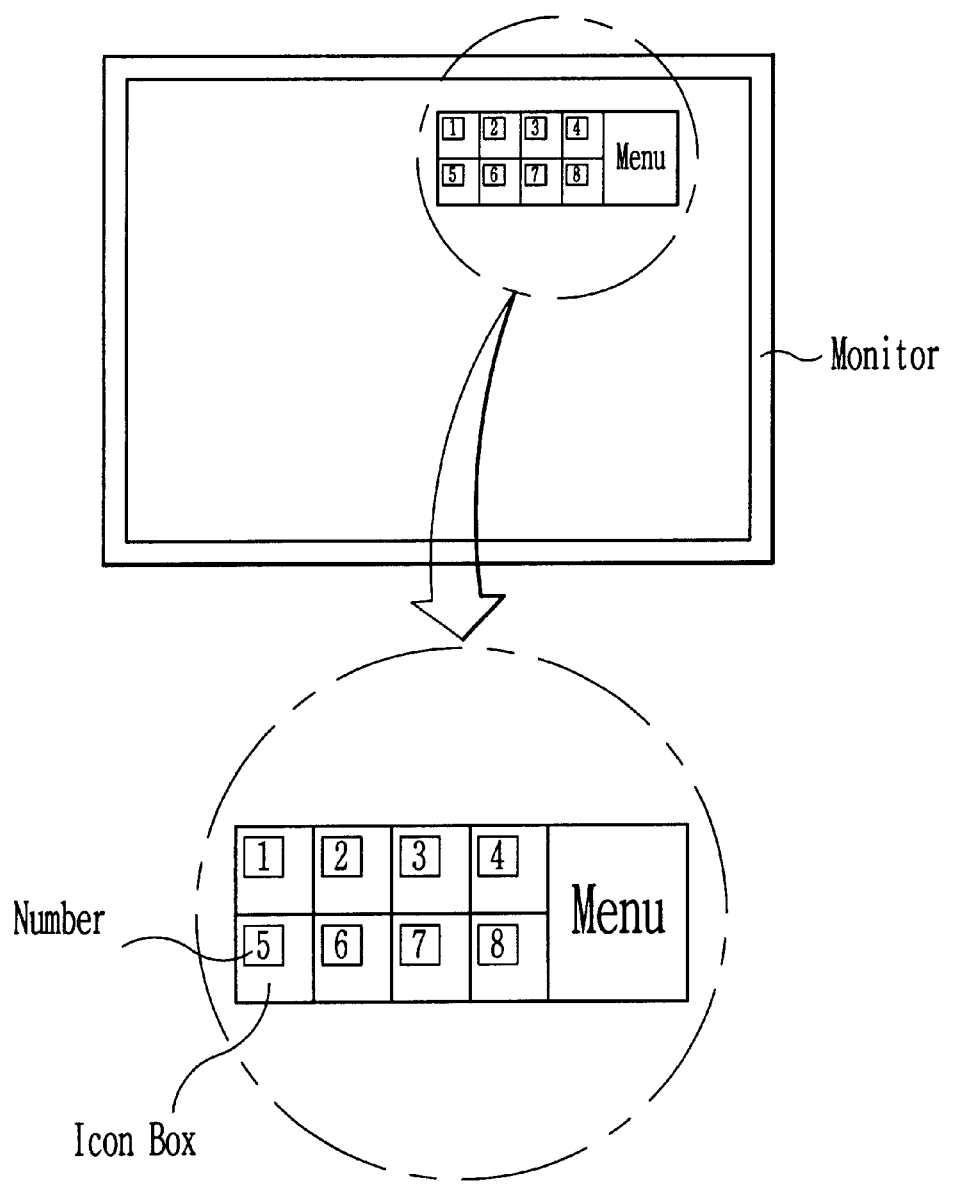
FIG. 5 and FIG. 6 show examples of output screen displayed on a monitor according to the present invention.

Here, if the program selection driving program is registered as an "initial program" of the Window 95, the program selection driving program is loaded in the main memory 21 at the same time when the Window 95 is executed, and then a mini-shell is displayed in the initial menu screen of the Window 95 as shown in FIG. 5.

The mini-shell includes a chain of numbers and an icon box showing icons of registered programs corresponding to the respective numbers. And the mini-shell denoting "MENU" is for making reference to the programs registered by user's selection.

Figures 6, 7:
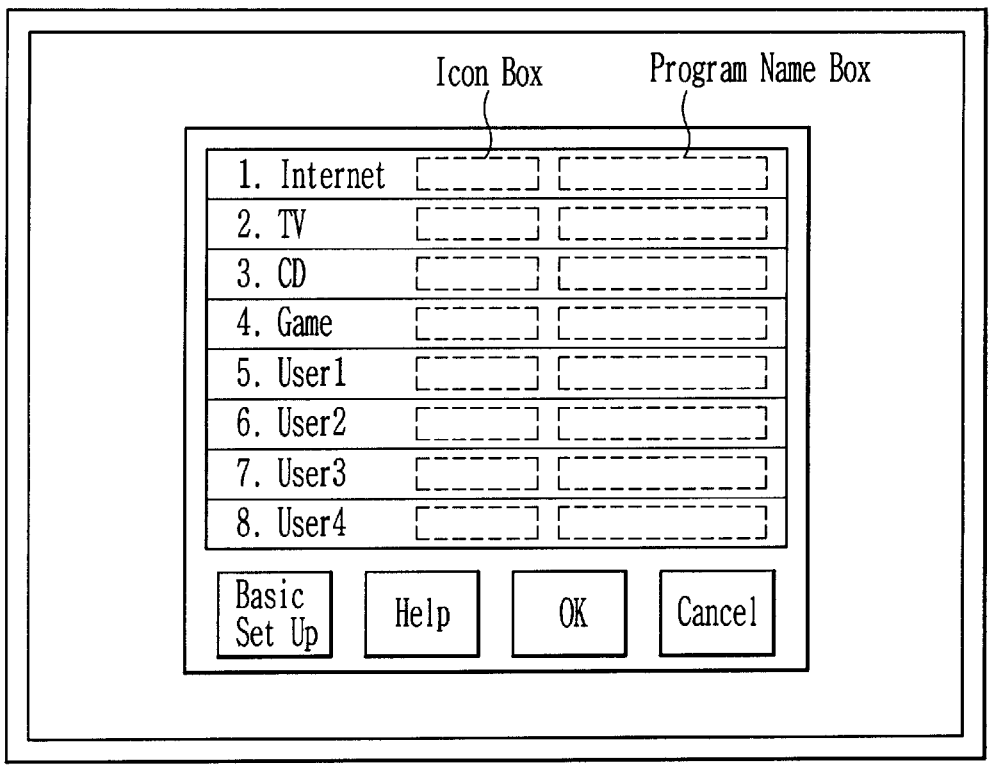
FIG. 7 illustrates registered program information stored at a hard disk.

FIG. 6 shows an example of the menu screen appears on the monitor when the user selects the MENU, the menu screen shows the numbers of the registered programs, icons and program names. And "BASIC SET UP" is for resetting to the initial status registered at the stage of production.

The methods to execute the program selection function includes an usual methods a user clicks an icon of a desirous program on the mini-shell of FIG. 5 and on the menu screen of FIG. 6, using a mouse, a methods the user operates the selecting buttons of the button panel 712 established in front of the main computer and a methods the user selects a number of a desirous program, that is, a number of the mini-shell in FIG. 5 using a remote controller, not depicted.

Meanwhile, a predetermined record region of the hard disk stores information data related to the registered program.

FIG. 7 shows an example of configuration of information data stored at the hard disk, the information data including scan code data, directory information and the executing file names, corresponding to the registered program, as ASCII data. Here, the scan code data correspond to the scan code data outputted from the microprocessor 61 according to the selection of the button panel 40 or the reception of the remote signal of FIG. 3.

That is, when a signal data is inputted into the microprocessor 61 as a user operates a button of the button panel 40 or of the remote controller at the user's option, the microprocessor 61 outputs a scan code data corresponding to the inputted signal data through the output port B0 to B6 and at the same time outputs a record signal $\overline{\text{WR}}$ of "L" level to the first flip-flop 65.

Meantime, in FIG. 2, the CPU 20 inputs output data SDO to SD7 of the output buffer 62, when detecting that the value of the eighth bit SD7 of the system data bus is "1", and searches the record region of FIG. 7 based on inputted data value (scan code value) so as to read out a directory information and an execution file corresponding to its scan code value, thus executing corresponding program.

As the program executed through the above process can be terminated through the same process, the CPU 20 executes terminating process when the scan code data of the present program in execution is inputted through the signal input device 30 of FIG. 3.

Besides, in the above configuration, the programs can be registered and changed by an usual drag and drop function. That is, when a user clicks an icon of a program that the user wants to register newly on the mini-shell of FIG. 5 and drags it on a mini-shell region he or she wants, the CPU 20 executes a program change function by renewing the record region of FIG. 7, based on a directory information and execution file name of the program.

Furthermore, the program can be registered and changed on the menu screen of FIG. 6. That is, when the user double-clicks the number of program he or she wants to register using a mouse on the menu screen, the CPU 20 displays the directory information of the program stored at the hard disk on the monitor at present. And then the user clicks a specified program indicating region on the directory information of the menu screen using the mouse, the CPU 20 executes a program change function by renewing the record region of FIG. 7, based on the information related to the registered program.

Accordingly, the user can execute a desirous program using a plurality of selecting buttons established on an outside of the computer or a remote controller and change the registered program with ease.

And it is possible to increase the effective number of executable program through a simple procedure as the selection of program is executed by data access through microprocessor.

It will be apparent to those skilled in the art that various modifications and variations can be made in the program selection driving device for a personal computer of the present invention without departing from the spirit or scope of the invention. Thus, it is intended that the present invention cover the modifications and variations of this invention provided they come within the scope of the appended claims and their equivalents.

What is claimed is:

1. A program selection driving device for a personal computer, having a main computer with a hard disk, a main memory, a display means for displaying picture data visually and input means including a keyboard and/or mouse comprising:

a selecting means having a plurality of program selecting buttons for driving programs and for outputting selecting signals;

a signal input means for receiving selecting signals from the selecting means and outputting predetermined data corresponding to the selecting signals;

a first memory means for storing available programs to be selected by the selecting means;

a second memory means for storing a program for program selection driving;

a third memory means for storing program information to be selected by the selecting means; and a central processing unit for executing the program stored at the second memory means, for detecting program information stored at the third memory means based on a selecting signal inputted from the signal input means, and for executing a corresponding program stored at the first memory means according to the detected information, selectively;

the selecting buttons being set to correspond with each predetermined program, and the program information stored at the third memory means being re-allotted to the respective selecting buttons at user's option, in execution of the program stored at the second memory means.

2. The program selection driving device for a personal computer as claimed in claim 1, wherein the first memory means, the second memory means and the third memory means established in a hard disk.

3. The program selection driving device for a personal computer as claimed in claim 1, wherein a program allotment to the selecting buttons is executed by a drag and drop function.

4. The program selection driving device for a personal computer as claimed in claim 1, wherein the selecting means is a button panel formed on an outside of the computer.

5. The program selection driving device for a personal computer as claimed in claim 1, wherein the selecting means is a remote controller.

6. The program selection driving device for a personal computer as claimed in claim 1, wherein the selecting means includes a menu selecting button additionally, the central processing unit outputs program information, stored at the third memory means, through the display means, when a menu selecting signal is inputted from the signal input means.

* * * * *